United States Patent [19]

Sato et al.

[11] Patent Number: 5,483,477

[45] Date of Patent: Jan. 9, 1996

[54] MULTIPLYING CIRCUIT AND MICROCOMPUTER INCLUDING THE SAME

[75] Inventors: Fumiki Sato; Kouichi Fujita, both of Itami, Japan

[73] Assignee: Mitsubishi Denki Kabushiki Kaisha, Tokyo, Japan

[21] Appl. No.: 205,457

[22] Filed: Mar. 4, 1994

[30] Foreign Application Priority Data

Mar. 10, 1993 [JP] Japan .................................. 5-075110

[51] Int. Cl.$^6$ .................................. G06F 7/52; G06F 7/00; G06F 15/00
[52] U.S. Cl. .................. 364/757; 364/746.2; 364/754; 364/760
[58] Field of Search .................... 364/757, 754, 364/765, 760, 736, 746.2

[56] References Cited

U.S. PATENT DOCUMENTS

| | | | |
|---|---|---|---|
| 4,238,833 | 12/1980 | Ghest et al. | 364/766 |
| 4,538,239 | 8/1985 | Magar | 364/754 |
| 4,644,488 | 2/1987 | Nathan | 364/726.05 |
| 4,868,777 | 9/1989 | Nishiyama et al. | 364/746.2 |
| 5,231,415 | 7/1993 | Hagihara | 364/760 |
| 5,365,471 | 11/1994 | Sato | 364/746.2 |

OTHER PUBLICATIONS

"A New Carry–Free Division Algorithm And Its Application To A Single–Chip 1024–b RSA Processor", pp. 748–756, IEEE Journal of Solid–State Circuits, vol. 25, No. 3, Jun. 1990.

Primary Examiner—Tan V. Mai
Assistant Examiner—Emmanuel L. Moise
Attorney, Agent, or Firm—Lowe, Price, LeBlanc & Becker

[57] ABSTRACT

A multiplying circuit wherein an adder 7 outputs a value "0" in which both of a positive part and a negative part of a number with a redundant code are "1", and at a last cycle of the multiplication cycles, the finish detecting circuit 13 detects finishing of multiplication cycles by detecting that "1" exists in a portion storing a positive part of a number with a redundant code of the third bit from the lowest bit of the second latch 8 and in a portion storing a negative part of the same at the same time. In such a construction, a counter circuit for counting multiplication cycles according to the Booth algorithm utilizing a number with a redundant code can be omitted. Accordingly, the number of transistors is reduced and the circuit configuration becomes simple.

6 Claims, 9 Drawing Sheets

| X | Y | Z | Q2 | Q1 |
|---|---|---|----|----|
| 1 | 1 | 1 | 1  | 1  |
| 1 | 1 | 0 | 0  | 0  |
| 1 | 0 | 1 | 0  | 0  |
| 1 | 0 | 0 | 0  | 1  |
| 0 | 1 | 1 | 1  | 0  |
| 0 | 1 | 0 | 1  | 1  |
| 0 | 0 | 1 | 1  | 1  |
| 0 | 0 | 0 | 0  | 0  |

Fig. 5

| B2 | B1 | B0 | ACN2 | ACN1 | ACN0 |
|----|----|----|------|------|------|
| 0  | 0  | 0  | 0    | 0    | 1    |
| 0  | 0  | 1  | 1    | 1    | 0    |
| 0  | 1  | 0  | 1    | 1    | 0    |
| 0  | 1  | 1  | 0    | 1    | 0    |
| 1  | 0  | 0  | 0    | 1    | 1    |
| 1  | 0  | 1  | 1    | 1    | 1    |
| 1  | 1  | 0  | 1    | 1    | 1    |
| 1  | 1  | 1  | 0    | 0    | 1    |

Fig. 7

| X2 | ACN1 | ACN0 | Y |
|----|------|------|---|
| 0  | 0    | 0    | 0 |
| 0  | 0    | 1    | 1 |
| 0  | 1    | 0    | 0 |
| 0  | 1    | 1    | 1 |
| 1  | 0    | 0    | 0 |
| 1  | 0    | 1    | 1 |
| 1  | 1    | 0    | 1 |
| 1  | 1    | 1    | 0 |

MULTIPLYING CIRCUIT AND MICROCOMPUTER INCLUDING THE SAME

BACKGROUND OF THE INVENTION

1. Field of the Invention

The present invention relates to a multiplying circuit used in a CPU, and relates to a microcomputer including such multiplying circuit.

2. Description of the Related Art

A principle of subtraction shift-type-division which performs a subtraction between a dividend or partial remainder by RSD representation and a divisor by twos complement representation is shown in pages 748 to 756 of the IEEE, Journal of Solid-State Circuit, Vol. 25, No. 3 (June, 1990).

A number by RSD (Redundant Signed Digit) representation is a numerical representation which represents the number of each digit by $\{-1, 0, 1\}$, and is expressed as Y in the following expression.

$$Y = \sum_{i=0}^{n} (Y_i^{**} - Y_i^*) 2^i;\ Y_i^{**}, Y_i^* \in \{0, 1\}$$

While, a number by twos complement representation is expressed as Z in the following expression.

$$Z = -2^n Z_n + \sum_{i=0}^{n-1} Z_i 2^i;\ Z_n, Z_i \in \{0, 1\}$$

The above-mentioned number Y by RSD representation and the number Z by twos complement, representation are added as shown in a schematic diagram of FIG. 1, and their sum S is obtained as a number by RSD representation shown in the following expression.

$$S = \sum_{i=0}^{n+1} (S_i^{**} - S_i^*) 2^i;\ S_i^{**}, S_i^* \in \{0, 1\}$$

In FIG. 1, symbols of large ○ respectively designate full adders, and symbols of small ○ respectively designate inverted inputs to or inverted outputs from the full adders.

FIG. 2(a) is a schematic diagram showing inputs and outputs to and from the full adder shown in FIG. 1, and FIG. 2(b) is a truth table therebetween.

While, the number Y by RSD representation and the number Z by twos complement representation are subtracted as shown in a schematic diagram of FIG. 3, and their difference D is obtained as the number by RSD representation shown in the following expression.

$$D = \sum_{i=0}^{n+1} (D_i^{**} - D_i^*) 2^i;\ D_i^{**}, D_i^* \in \{0, 1\}$$

In FIG. 3, in the same way as FIG. 1, the symbols of large ○ respectively designate the full adders and the symbols of small ○ respectively designate the inverted inputs to or the inverted outputs from the full adders.

Truth tables of the full adders shown in FIG. 3 are similar to that shown in FIG. 2(b).

Such addition and subtraction of the number Y by RSD representation and the number Z by twos complement representation can be performed rapidly because of free from carry propagations.

The Booth algorithm is well known as a multiplication for a high speed multiplying circuit. In the case where a multiplying circuit is realized by the Booth algorithm, there are two techniques. One of them is such that partial products are simultaneously generated, and all of them are statically added. Another is such that partial products are repeatedly added. In the latter, addition and subtraction by abovementioned number by RSD representation and number by twos complement representation can be used. That is, a number by RSD representation is used for partial products and number by twos complement representation is used for multipliers. In addition, a counter is used for counting repetition numbers (multiplication cycles).

The conventional multiplying circuit is constructed as abovementioned, since a counter is used for counting the multiplication cycles, a problem of increasing a number of transistors occurs. Also, when the higher bits of the product obtained as a number with redundant code is converted into binary number, compensation by lower bits of the product is required.

SUMMARY OF THE INVENTION

The present invention has been devised in order to solve such problems as aforementioned, and an object of a first invention is to provide a multiplying circuit and a microcomputer being provided with it which are not required to use such a counter circuit as aforementioned, thus is capable of reducing the number of transistors.

A second invention is a multiplying circuit used in case of performing binary conversion of a product by a CPU, and an object thereof is to provide a multiplying circuit and a microcomputer being provided with it in which higher binary conversion of higher bits of a product can be done in the same way, not depending on a lower bit of a product, by performing a higher compensation of a product before reading upper bits of a product by the CPU.

Further, an object of the third invention is to provide a multiplying circuit and a microcomputer being provided with it capable of performing summing of products by adding a small number of transistors.

A multiplying circuit related to the first invention is provided with addend selecting means for outputting a number in which all bits are "1" before multiplication cycle, an adder for adding the outputs of the addend selecting means, and a second register for storing a multiplicand or a partial product, as well as finish detecting means for detecting a last cycle of the multiplication cycles from the output of the second register.

A multiplying circuit related to the second invention is provided with a first register for storing a part of a partial product, second register for storing a multiplicand or a part of a partial product indicated by a number with a redundant code, and sign judging means for judging a sign of the second register after the multiplication cycle.

A multiplying circuit related to the third invention is provided with a second register storing a multiplicand or a part of a partial product indicated by a number with a redundant code, and a sum of products register performing summing of products by receiving the content of the second register.

In the multiplying circuit according to the first invention, a number in which all of the bits are "1" is outputted by the addend selecting means before multiplication cycle, and a value "0" in which both of the positive part and the negative part of a number which a redundant code are "1" is outputted by the adder, and the finish of the multiplication cycles is detected by detecting that "1" exists both in a portion storing the positive part of a number with a redundant code and in a portion storing the negative part of the same at the same time, by the finish detecting means at the last cycle.

In the multiplying circuit according to the second invention, after the multiplication cycle, a sign of the second register is judged by the sign judging means, and responsive to the result of judgment, a content of the first register is compensated.

In the multiplying circuit according to the third invention, a content of the sum of products register is used in place of "0" as the first partial product, and a product is written into the sum of products register at the last multiplication cycle.

The above and further objects and features of the invention will more fully be apparent from the following detailed description with accompanying drawings.

BRIEF DESCRIPTION OF THE DRAWINGS

FIG. 5 is a truth table showing operations of a Booth decoder;

FIG. 7 is a truth table of a signal X, a signal ACN1, a signal ACN0, and a signal Y;

DESCRIPTION OF THE PREFERRED EMBODIMENTS

In the following, explanation will be made in detail on the invention referring to drawings showing the embodiments thereof.

[Embodiment 1]

At first, explanation will be made on the first invention of the multiplying circuit and a microcomputer being provided with it.

Figure 1:
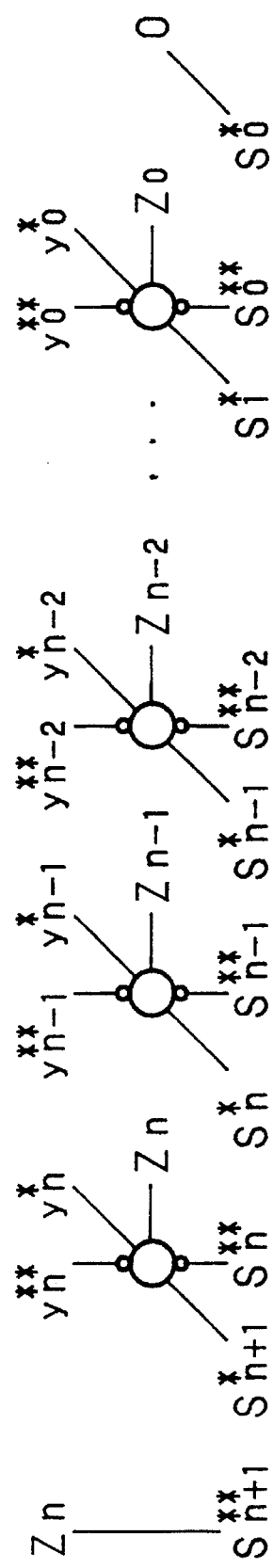
FIG. 1 is a schematic diagram showing a configuration for adding a number by RSD representation and a number by twos complement representation.
Figures 2A, 2B:
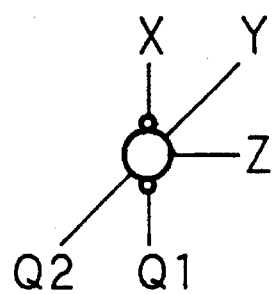
FIG. 2(a) is a schematic diagram showing input and output of each adder shown in FIG. 1.
FIG. 2(b) is a truth table among them.
Figure 3:
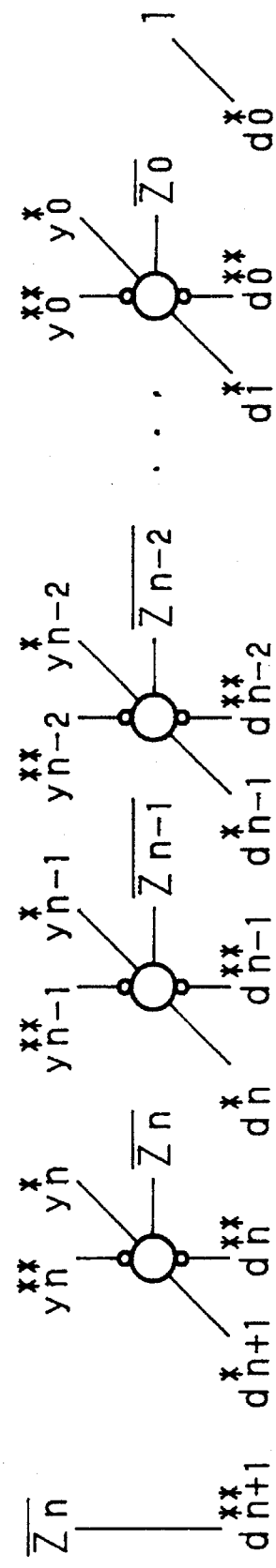
FIG. 3 is a schematic diagram showing a configuration for subtracting a number by RSD representation and a number by twos complement representation.
Figure 4:
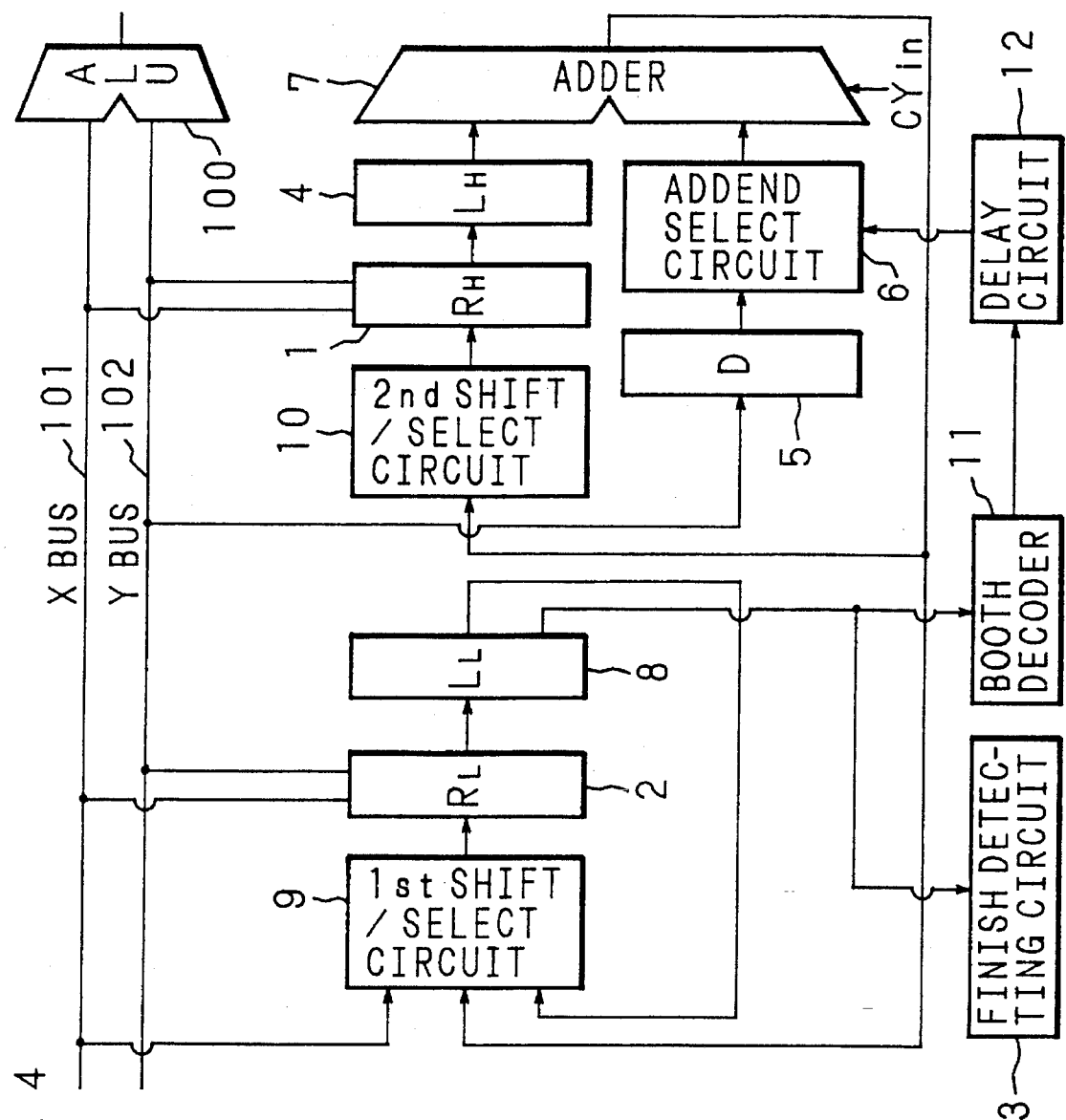
FIG. 4 is a configuration diagram showing a multiplying circuit according to one embodiment of an invention as set forth in claim 1.

FIG. 4 is a block diagram showing a configuration of one embodiment of the first invention of a multiplying circuit related to the invention and a microcomputer being provided with it. In addition, the multiplying circuit of the first invention is the one which obtains a product of n bits from a multiplier of n bits and a multiplicand of n bits.

In FIG. 4, reference numeral 100 designates an ALU in a CPU, 101 an X bus, and 102 Y bus.

Numeral 1 designates a first register of n+1 bits storing a part of a partial product indicated by a number with a redundant code. The first register 1 is composed of a portion which is connected to the X bus 101 and stores a positive part of a number with a redundant code and of a portion which is connected to the Y bus 102 and stores a negative part of a number with a redundant code.

Numeral 2 designates a second register of n+1 bits which stores a part of a multiplicand or a partial product indicated by a number with a redundant code.

The second register 2 is composed of a portion which is connected to the X bus 101 and stores a positive part of a number with a redundant code and of a portion which is connected to the Y bus 102 and stores a negative part of a number with a redundant code.

Numeral 4 designates a first latch as first latching means retaining the output of the first register 1 temporarily.

Numeral 5 designates a third register which stores a multiplier by twos compliment representation. The third register 5 is connected to the Y bus 102.

Numeral 6 designates an addend select circuit as addend selecting means, which inputs the output of the third register 5 and generates one of a number of two times of a multiplier, an inverted value of the number of two times of the multiplier, the multiplier, an inverted value of the multiplier or a number in which all of the bits are "1", responsive to a signal outputted from a delay circuit 12 to be described later.

Numeral 7 designates an adder which adds the output of the first latch 4 and the output of the addend select circuit 6 to each other. Numeral 8 designates a second latch as second latching means for temporarily retaining the output of the second register 2.

Numeral 9 designates a first shift/select circuit as first shifting/selecting means, which is connected to the X bus 101.

To the first shift/select circuit 9, the lower 2 bits of the output of the adder 7, the output of the second latch 8, a value of the X bus 101 in the CPU are inputted. And the first shift/select circuit 9, to a portion storing a positive part of a number with a redundant code of the second register 2, outputs a number in which the output of the second latch 8 is made into the lower bits thereof by shifting to the right by two bits and the lower two bits of the output of the adder 7 are made intact into the higher two bits thereof, or a number in which a content (a multiplicand) of the X bus 101 is made into the higher bits thereof and "0" is made into the least significant bit thereof. The first shift/select circuit 9, to a portion storing a negative part of a number with a redundant code of the second register 2, outputs a number in which the output of the second latch 8 is made into the lower bits thereof by shifting to the right by two bits and the lower two bits of the output of the adder 7 are made intact into the higher two bits thereof.

Numeral 10 designates a second shift/select circuit as second shifting/selecting means.

To the second shift/select circuit 10, the output of the adder 7 is inputted. The second shift/select circuit 10, to both of the portion storing a positive part of a number with a redundant code of the first register 1 and a portion storing a negative part of the same, outputs a number in which the output of the adder 7 is made into the lower bits thereof by shifting to the right, by 2 bits and "0" is made into the most significant bit thereof, respectively.

Numeral 11 designates a Booth decoder. The Booth decoder 11 inputs lower three bits of the portion storing a positive part of a number with a redundant code of the second latch 8, and generates a signal for controlling the addend select circuit 6.

Numeral 12 designates a delay circuit as delaying means.

The delay circuit 12 have a function of outputting the output of the Booth decoder 11 generated as aforementioned after delaying by one cycle of a synchronizing clock $\phi$ and a function of outputting a signal different from the output of the Booth decoder 11 by a control signal given from the Booth decoder 11. According to the signal outputted from the delay circuit 12, the addend select circuit 6 selects one from the aforementioned values as an addend.

Numeral 13 designates a finish detecting circuit as finish detecting means.

The finish detecting circuit 13 detects the finish of multiplication in the case where "1" exists simultaneously in a portion storing a positive part of a number with a redundant code of lower three bits of the second latch 8 and in a portion storing a negative part of the same.

FIG. 5 is a truth table showing operations of the Booth decoder. In FIG. 5, symbols B2, B1, B0 designate the lower three bits, as the inputs, of the portion storing the positive part of a number with redundant code of the second latch 8, and symbols ACN2 to ACN0 designate outputs.

Figure 6:
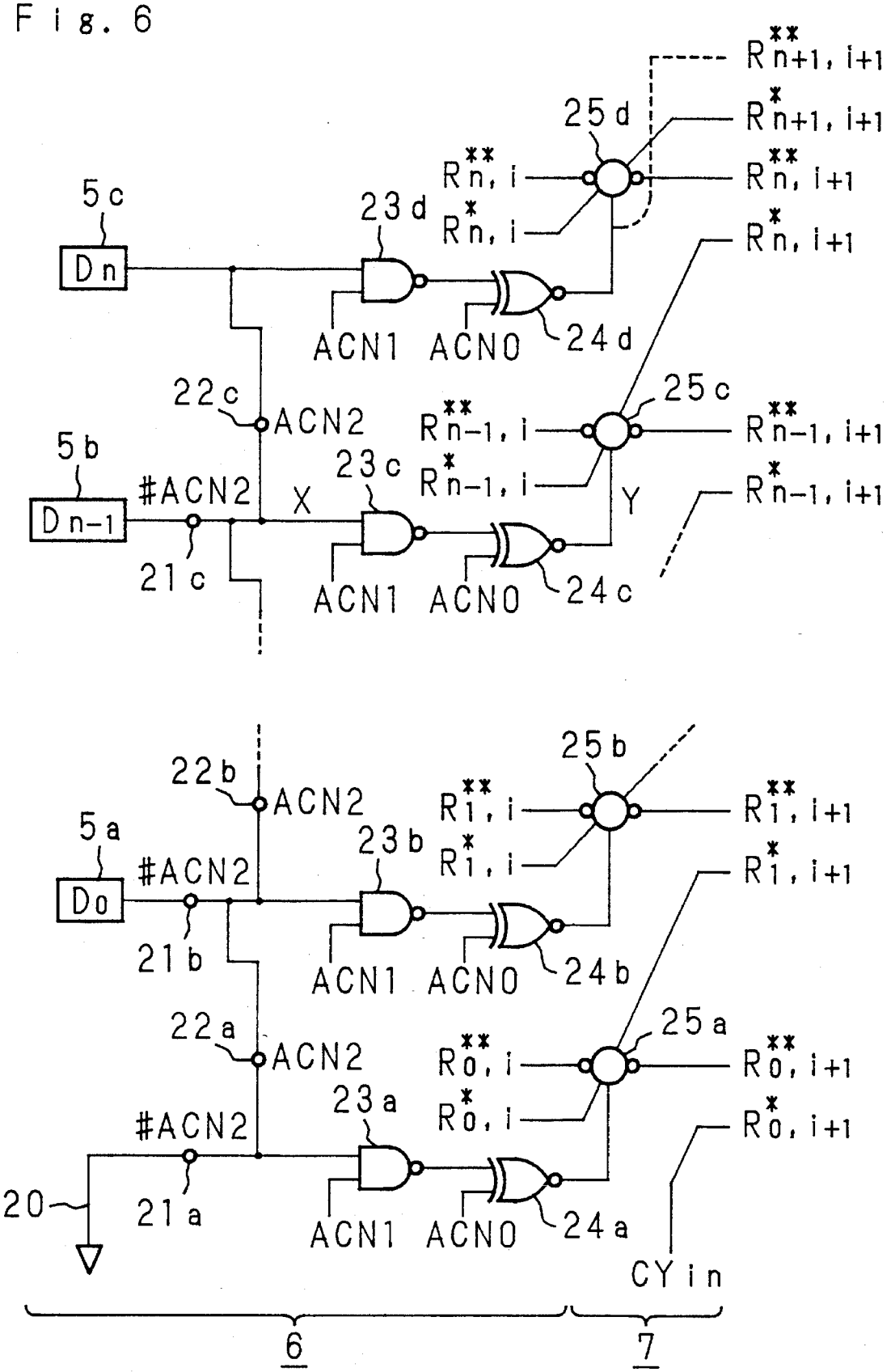
FIG. 6 is a circuit diagram showing configuration of an addend select circuit together with that of an adder, used in the respective embodiments of the invention.

FIG. 6 is a circuit diagram showing a configuration of the addend select circuit 6 together with that of the adder 7.

In FIG. 6, reference symbols 5a, 5b, 5c designate bit 0 ($D_0$), bit n-1 ($D_{n-1}$), bit n ($D_n$) of the third register 5 storing a multiplier.

Numeral 20 designates an earth.

Symbols 21a, 21b, 21c designate gates as electric switching means which become conductive state when the signal ACN2 is "0" (#ACN2). Symbols 22a, 22b, 22c are gates as electric switching means which become conductive state when the signal ACN2 is "1" (ACN2).

Symbols 23a, 23b, 23c, 23d are NAND gates. To one input of each of the NAND gates 23a, 23b, 23c, 23d, the signal ACN1 is inputted. To the other input of the NAND gate 23a, the outputs of the gate 21a and the gate 22a are inputted, to the other input of the NAND gate 23b, the outputs of the gate 21b and the gate 22b, and to the other input of the NAND gate 23c, the outputs of the gate 21c and the gate 22c, after being wired OR respectively. In addition, to the other input of the NAND gate 23d, only the output of the latch 5c is inputted.

Symbols 24a, 24b, 24c, 24d are exclusive NOR gates. To one input of each of the exclusive NOR gates 24a, 24b, 24c 24d, each output of the NAND gates 23a, 23b, 23c, 23d is inputted respectively, and to the other input of each of them, the signal ACN0 is commonly inputted.

Symbols 25a, 25b, 25c, 25d designate generalized full adders. Signal $R^*_{j, i}$, signal $R^{**}_{j, i}$ and the respective outputs of the exclusive NOR gates (24a, 24b, 24c, 24d) are inputs of the full adders 25a, 25b, 25c, 25d respectively, and the signal $R^*_{j, i+1}$ and signal $R^{**}_{j, i+1}$ are outputs of the full adders 25a, 25b, 25c, 25d. Symbol of small ○ located at positions of input and output at each of the full adders 25a, 25b, 25c, 25d means inverted input or inverted output.

Here, i indicate the number of operations, and j indicates the bit position. And, "*" indicates a positive part of a number with a redundant code, and "**" indicates a negative part of the same.

As described above, FIG. 6 shows a configuration for only three bits, however, the addend select circuit 6 is composed of the gates 21a to 21c, gates 22a to 22c, NAND gates 23a to 23d, and exclusive NOR gates 24a to 24d and the like, and the adder 7 is composed of the generalized full adders 25a to 25d.

FIG. 7 shows a truth table of the signal X, signal ACN1, signal ACN0 and signal Y. Here, the signal X designates one input of each of the NAND gate 23a to 23d, and the signal Y designates outputs of the exclusive NOR gates 24a to 24d, respectively.

Next, explanation will be given on the operation of the first invention of the multiplying circuit of the present invention as aforementioned.

The CPU, during execution of multiplication instruction and the synchronizing clock $\phi$ is "1", outputs a multiplicand to the X bus 101 and a multiplier to the Y bus, respectively. The multiplicand is taken into the first shift/select circuit 9 from the X bus 101.

The first shift/select circuit 9, to a portion storing a positive part of a number with a redundant code of the second register 2, outputs a number in which a content of the X bus 101 is made intact into the higher bits thereof and "0" is made into the least significant bit thereof, and also to a portion storing a negative part of a number with a redundant code of the second register 2, outputs a number in which all bits are "0". Further, these values are written also into the second latch 8 through the second register 2.

The multiplier is written into the third register 5 from the Y bus 102.

The second shift/select circuit 10, to both of a portion storing a positive part of a number with a redundant code of the first register 1 and a portion storing a negative part of the same, outputs a number in which all bits are "0". These values are written into the first register 1 and further into the first latch 4.

The Booth decoder 11, receiving the lower three bits of a portion storing a positive part of a number with a redundant code of the second latch 8, generates a signal for controlling the addend select circuit 6. At this time, since the lower two bits of a multiplicand is inputted to the higher two bits among the aforementioned three bits, and the east significant bit is "0", a Booth decoding at a first time is performed without a problem.

When the synchronizing clock $\phi$ of the CPU rises, a clock $\phi$MD of the multiplying circuit begins to start. When the multiplying circuit is not operated, the clock $\phi$MD of the multiplying circuit is kept to be "1". Until the clock $\phi$MD of the multiplying circuit rises next, the delay circuit 12 outputs "0" as the signal ACN1 and "1" as the signal ACN0, respectively. Receiving them, the addend select circuit 6 outputs a number in which all bits are "1". And to the adder 7, the signal ACN0 is inputted as the signal CYin, and the adder 7 outputs a value "0" in which both a positive part and a negative part of a number with a redundant code are "1".

When the clock $\phi$MD of the multiplying circuit falls, the first shift/select circuit 9, to the second register 2, outputs a number in which the output of the second latch 8 is made into the lower bits thereof by shifting to the right by two bits and the lower two bits of the output of the adder 7 are made intact into be the higher two bits thereof, and this value is written into the second register 2.

At the same time, the second shift/select circuit 10, to a portion storing a positive part of a number with a redundant code of the first register 1, outputs a number in which the output of the adder 7 is made into the lower bits thereof by shifting to the right by two bits and "0" is made into the most significant bit thereof. Thereby, to the first register 1, a value "0" is written in which both a positive part and a positive part of the most significant bit of a number with a redundant code are "0" and both a positive part and a negative part are "1" except the most significant bit.

From the next rising of the clock φMD of the multiplying circuit, the multiplication cycle by the Booth algorithm is started.

The content of the first register 1 is written in the first latch 4, and the content of the second register 2 is written in the second latch 8.

At this time, a Booth decoding for the first time is already finished, and the signal ACN1 and the signal ACN0 corresponding to this cycle are inputted to the addend select circuit 6 by the delay circuit 12.

The Booth decoder 11, receiving the lower three bits of a portion storing a positive part of a number with a redundant code of the second latch 8, generates at the next cycle the signal ACN1 and the signal ACN0 for controlling the addend select circuit 6.

When the clock φMD of the multiplying circuit falls, the first shift/select circuit 9, to the second register 2, outputs a number in which the output of the second latch 8 is made into the lower bits thereof by shifting to the right by two bits and the lower two bits of the output of the adder 7 are made intact into the higher two bits thereof, and the value is written in the second register 2.

At the same time, the second shift/select circuit 10, to a portion storing a positive part of a number with a redundant code of the first register 1, outputs a number in which the output of the adder 7 is made into the lower bits thereof by shifting to the right by two bits and "0" is made into the most significant bit thereof, and this value is written in the second register 2.

The multiplication cycle by such the aforementioned Booth algorithm is repeated. In the last cycle, the finish detecting circuit 13 detects that "1" exists in a portion storing a positive part and a portion storing a negative part of a number with a redundant code of the third bit from the least significant bit side of the second latch 8, thereby the finish of multiplication is detected. After this, the clock φMD of the multiplying circuit rises to finish multiplication.

When multiplication is finished, a content of the higher n bits of a portion storing a positive part of a number with a redundant code of the second register 2 is read out to the X but 101, and a content of the higher n bits of a portion storing a negative part of a number with a redundant code of the second register 2 is read out to the Y but 102. Further, by subtracting the content of the Y bus 102 from the content of the X bus 101 by the ALU100, a product as a last multiplication result is obtained.

[Embodiment 2]

Next, explanation will be made on the second invention of the multiplying circuit of the invention.

Figure 8:
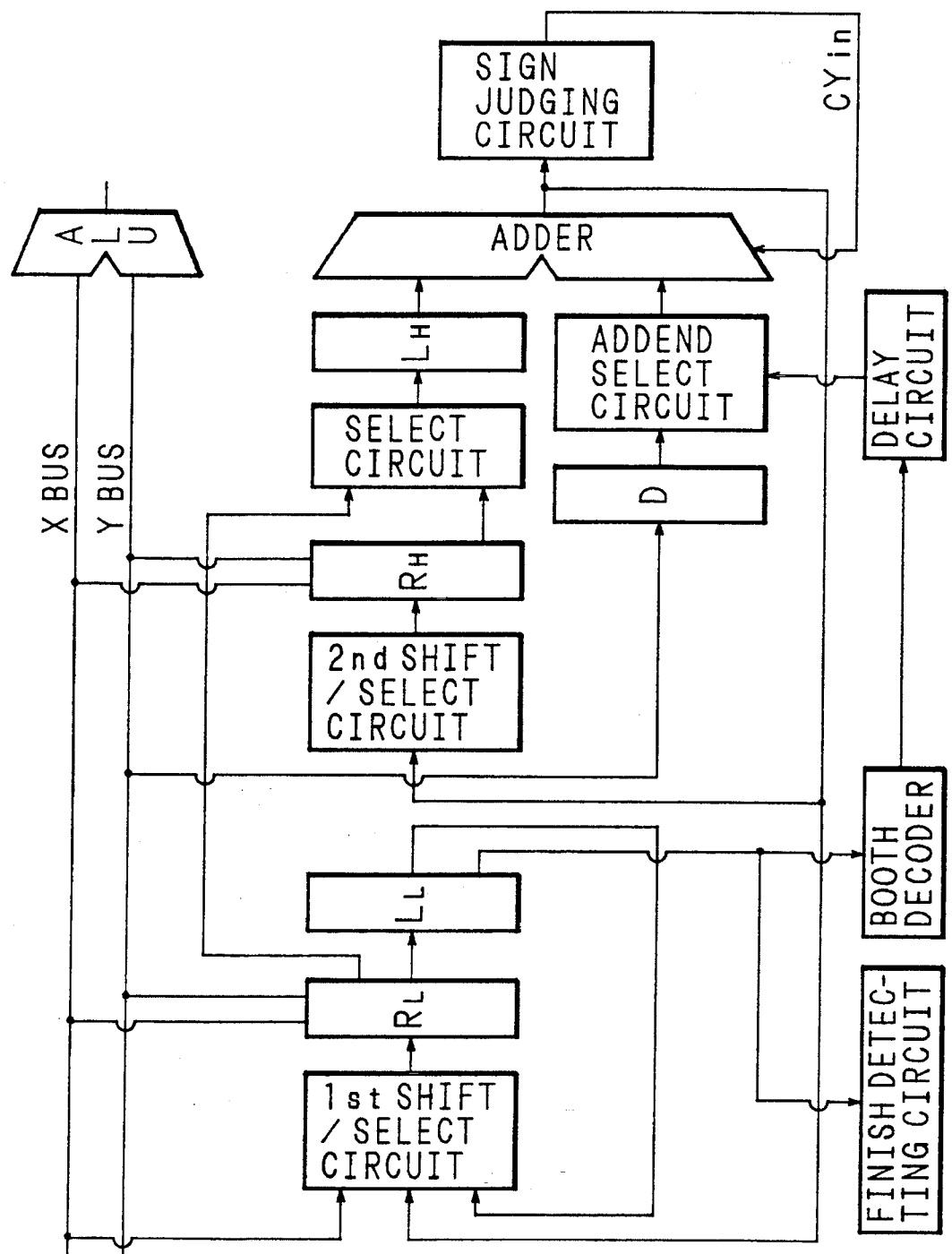
FIG. 8 is a configuration diagram showing a multiplying circuit according to one embodiment of the second invention.

FIG. 8 is a block diagram showing a configuration of one embodiment of the second invention of the multiplying circuit related to the invention. The multiplying circuit of the second invention is the one which obtains a product of 2n bits from a multiplier of n bits and a multiplicand of n bits.

In addition, in FIG. 8, the same reference characters as those shown in FIG. 4 which was referred to in the explanation of the aforementioned first invention show the same or corresponding portions, and the explanation thereof is omitted.

The second invention shown in FIG. 8 is different from the first invention in that the select circuit 3 is provided between the first register 1 and the first latch 4 of the first invention shown in FIG. 4 and a sign judging circuit 14 as sign judging means to which the output of the adder 7 is inputted is provided.

The select circuit 3 is supplied with the output of the first register 1 and the output of the second register 2, and selects either of the two to give it to the first latch 4. The sign judging circuit 14 judges the sign of the output of the adder 7.

In the multiplying circuit of the second invention described in the embodiment 2, it is constructed so that the content of the second register 2 is written into the first latch 4 through the select circuit 3 and the output of the adder 7 is shifted to the left by one bit by the shift/select circuit 10 to output it.

The multiplication cycle of the multiplying circuit of the second invention is performed in the same way as that of the multiplying circuit of the aforementioned first invention. And when the multiplication cycle is finished and the clock φMD of the multiplying circuit rises, the content of the second register 2 is written into the first latch 4 through the select circuit 3. At this time, the delay circuit 12 outputs "0" as the signal ACN1 and outputs "1" as the signal ACN0 in place of the output of the Booth decoder 11 so that the addend select circuit 6 outputs a number in which all bits are "1". And by the fact that signal ACN0 is inputted as the signal CYin, the adder 7 adds a value obtained by making the content of the second register 2 written in the first latch 4 to a value "0".

The sign judging circuit 14 judges a sign of the output of the adder 7.

Next, when the clock φMD of the multiplying circuit rises, the content of the first register 1 is written into the first latch 4 through the select circuit 3. Also at this time, the delay circuit 12 outputs "0" as the signal ACN1 and outputs "1" as the signal ACN0 respectively in place of the output of the Booth decoder 11 so that the addend select circuit 6 outputs a number in which all bits are "1".

At this time, by the judgment of the sign judging circuit 14, the content of the signal CYin is changed. To be concrete, when the result of the judgment by the sign judging circuit 14 is positive, "1" as the signal CYin is given to the adder 7, and when negative, "0" as the signal CYin is given to the same. Thereby, when the lower sign of a product is positive, the higher value of the product is obtained intact (however expression is different) as the output of the adder 7, and when the lower sign of the product is negative, a value obtained by subtracting "1" from the higher value of the product is obtained.

And when the clock φMD of the multiplying circuit falls, a value obtained by shifting the output of the adder 7 to the left by one bit, is written in the first register 1 through the second shift/select circuit 10.

When multiplication is finished, the content of the higher n bits of a portion storing a positive part of a number with a redundant code of the second register 2 is read out to the X bus 101, and the content of the higher n bits of a portion storing a negative part of a number with a redundant code of the second register 2 is read out to the Y bus 102, respectively. Further, by subtracting the content of the Y bus 102 from the content of the X bus 101 by the ALU100, the lower bits of a product is obtained.

The content of the higher n bits of a portion storing a positive part of a number with a redundant code of the first register 1 is read out to the X bus 101, and the content of the higher n bits of a portion storing a negative part of a number with a redundant code of the first register i is read out to the Y bus 102, respectively. Further, by subtracting the content of the Y bus 102 from the content of the X bus 101 by the ALU100, the higher bits of a product is obtained.

[Embodiment 3]

Next, explanation will be given on the third invention of a multiplying circuit of the present invention.

Figure 9:
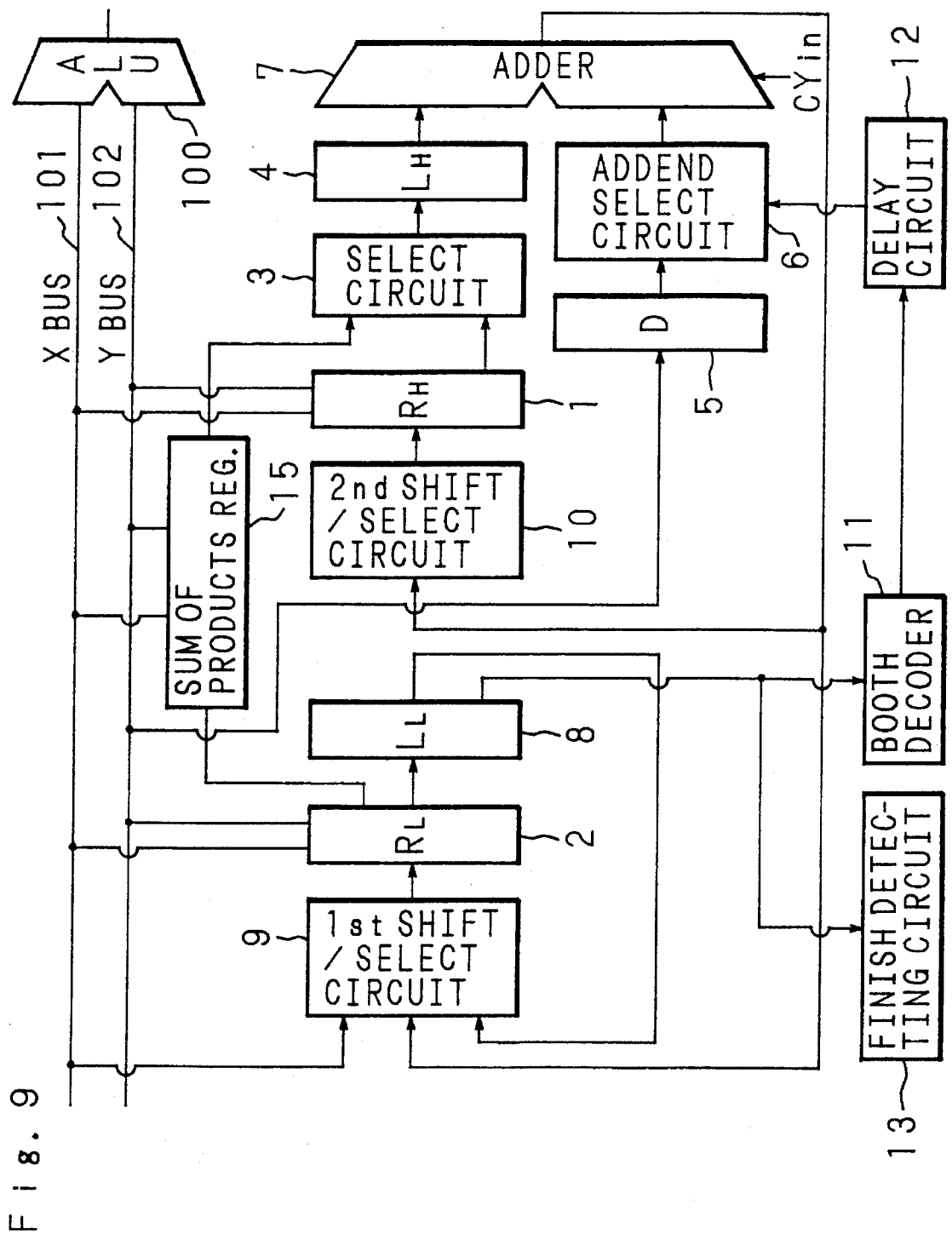
FIG. 9 is a configuration diagram showing a multiplying circuit according to one embodiment of the third invention.

FIG. 9 is a block diagram showing a configuration of one embodiment of the third invention of a multiplying circuit related to the invention. A multiplying circuit of the third invention is obtained by adding a sum-of-products function to the multiplying circuit of the first invention.

In addition, in FIG. 9, the same reference numerals as those in FIG. 4 which was referred to in the aforementioned first invention show the same or corresponding portions, and therefore the explanation thereof is omitted.

In the third invention shown in FIG. 9 is different from the first invention in that the select circuit 3 is provided between the first register 1 and the first latch 4 shown in FIG. 4, and to the select circuit 3, the output of a sum of products register 14 is given besides the output of the first register 1, and to the sum of products register 15, the output of the second register 2 is given.

To the select circuit 3, the output of the first register 1 and the output of the sum of products register 15 are given, and the select circuit 3 selects either of the two and gives it to the first latch 4.

And the sum of products register 15 is constructed by a sum of products register of n bits indicated by a numeral with a redundant code, and is composed of a portion connected to the X bus 101 and storing a positive part of a number with a redundant code and a portion connected to the Y bus 102 and storing a negative part of a number with a redundant code.

The sum of products register 15 can clear the content thereof by the CPU instruction. Further, the output of the first shift/select circuit 9 can be written in the sum of products register 15 through the higher n bits of the second register 2, and a number obtained by making the most significant bit "0" and by making the content of the sum of products register 15 lower n bits, can be written in the first latch 4 through the select circuit 3.

When performing a calculation of sum of products, the content of the sum of products register 15 is to be cleared by the CPU beforehand.

After a multiplier and a multiplicand for the calculation of sum of products are written, at the first rising of the clock φMD of the multiplying circuit, a number obtained by making the content of the sum of products register 15 whose most significant bit is "0" be lower n bits, written in the first latch 4 through the select circuit 3. After this, the same multiplication cycle as that of the multiplying circuit of the aforementioned first invention is performed. And at the falling of the clock φMD of the last multiplication cycle, the output of the first shift/select circuit 9 is written in the sum of products register 15 through the second register 2.

Thereby, a product is retained in the sum of products register 15. After this, in performing the calculation of sum of products, by not clearing the aforementioned sum of products register 15, products are accumulated in the sum of products register 15.

When the content of the sum of products register 15 is read out by the CPU, the content of a portion storing a positive part of a number with a redundant code of the sum of products register 15 is read out to the X bus 101, and the content of a portion storing a negative part of a number with a redundant code of the sum of products register 15 is read out to the Y bus 102, respectively. Further, by subtracting the content of the Y bus 102 from the content of the X bus 101 by the ALU 100 in the CPU, a sum of products is obtained.

As described in detail, according to the multiplying circuit and the microcomputer of the first invention, since it is constructed so that the addend selecting means outputs before the multiplication cycle a number in which all bits are "1" and the finish detecting means detects the last cycle from the output of the second register storing a multiplicand or a partial product, a counter circuit for counting the multiplication cycles is not necessary and the number of transistors can be reduced.

According to the multiplying circuit and the microcomputer of the second invention, a necessary compensation can be easily done before the CPU reads out the higher bits of a product represented by a number with a redundant code, since it is constructed so that the sign judging circuit, after the finishing of multiplication cycles, judges the sign of the second register storing a multiplicand or a part of a partial product indicated by number with redundant code, and the content of the first register storing a portion of a partial product is compensated according to the judged result.

Further, according to a multiplying circuit and the microcomputer of the third invention, summing of products is realized by adding a small number of circuits, since it is constructed so that the content of the sum of products register is employed as a first partial product and at the last of the multiplication cycle, a product is written in the sum of products register.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A multiplying circuit, comprising:

a first register which includes a portion storing a positive part of a number with a redundant code and a portion storing a negative part of the same, and which stores a part of a partial product indicated by a number with a redundant code;

a second register which includes a portion storing a positive part of a number with a redundant code and a portion storing a negative part of the same, and which stores a multiplicand or a part of a partial product indicated by a number with a redundant code;

a third register which stores a multiplier by twos complement representation;

addend selecting means for selecting any one of a number of two times of the multiplier, an inverted value of the number of two times of the multiplier, the multiplier, an inverted value of the multiplier or a number in which all bits are "1", by receiving an output of said third register;

an adder to which a carry signal is inputted, and which adds an output of said first register and an output of said addend selecting means to each other;

first shifting/selecting means, into which an output of said adder, an output of said second register and the multiplicand are inputted, for, to the portion storing the positive part of a number with a redundant code of said second register, outputting a number in which the output of said second register is made into the lower bits thereof and the output of said adder is made into the higher bits thereof, or a number in which said multiplicand is made into the higher bits thereof and "0" is made into the lower bits thereof, and for, to the portion storing the negative part of the same, outputting a number in which the output of said second register is made into the lower bits thereof and the output of said adder is made into the higher bits thereof;

second shifting/selecting means for, to the portions storing the positive and negative parts of a number with a redundant code of said first register, outputting a number in which the output of said adder is made into the lower bits thereof and "0" is made into the most significant bit thereof, by receiving the output of said adder;

a Booth decoder which generates a signal for controlling said addend selecting means by receiving the lower bits of the portion storing the positive part of a number with a redundant code of said second register; and finish detecting means for detecting the finishing of multiplication cycles by detecting that "1" exists in the portion storing the positive part and the negative part of a number with a redundant code of the lower bits of said second register.

2. A multiplying circuit, comprising:

a first register which includes a portion storing a positive part of a number with a redundant code and a portion storing a negative part of the same, and which stores a part of a partial product indicated by a number with a redundant code;

a second register which includes a portion storing a positive part of a number with a redundant code and a portion storing a negative part of the same, and which stores a multiplicand or a part of a partial product indicated by a number with a redundant code;

selecting means for selecting either an output of said first register or an output of said second register, and outputting it;

a third register which stores a multiplier by twos complement representation;

addend selecting means for selecting any one of a number of two times of the multiplier, an inverted value of the number of two times of the multiplier, the multiplier, an inverted value of the multiplier or a number in which all bits are "1", by receiving an output of said third register;

an adder to which a carry signal is inputted, and which adds an output of said selecting means and an output of said addend selecting means to each other;

first shifting/selecting means, into which an output of said adder, the output of said second register and the multiplicand are inputted, for, to the portion storing the positive part of a number with a redundant code of said second register, outputting a number in which the output of said second register is made into the lower bits thereof and the output of said adder is made into the higher bits thereof, or a number in which said multiplicand is made into the higher bits thereof and "0" is made into the lower bits thereof, and for, to the portion storing the negative part of the same, outputting a number in which the output of said second register is made into the lower bits thereof and the output of said adder is made into the higher bits thereof;

second shifting/selecting means for, to the portions storing the positive and negative parts of a number with a redundant code of said first register, outputting a number in which the output of said adder is made into the lower bits thereof and "0" is made into the most significant bit thereof, by receiving the output of said adder;

a Booth decoder which generates a signal for controlling said addend selecting means by receiving the lower bits of the portion storing the positive part of a number with a redundant code of said second register;

finish detecting means for detecting the finishing of multiplication cycles by detecting that "1" exists in the portion storing the positive part and the negative part of a number with a redundant code of the lower bits of said second register; and sign judging means for judging a sign of the output of said adder, and giving "1" when the judged sign is positive and "0" when the judged sign is negative as the carry signal respectively to said adder.

3. A multiplying circuit, comprising:

a first register which includes a portion storing a positive part of a number with a redundant code and a portion storing a negative part of the same, and which stores a part of a partial product indicated by a number with a redundant code;

a second register which includes a portion storing a positive part of a number with a redundant code and a portion storing a negative part of the same, and which stores a multiplicand or a part of a partial product indicated by a number with a redundant code;

a sum of products register for accumulating outputs of said second register;

selecting means for selecting either an output of said first register or an output of said sum of products register, and outputting it;

a third register which stores a multiplier by twos complement representation;

addend selecting means for selecting any one of a number of two times of the multiplier, an inverted value of the number of two times of the multiplier, the multiplier, an inverted value of the multiplier or a number in which all bits are "1", by receiving an output of said third register;

an adder to which a carry signal is inputted, and which adds the output of said first register and an output of said addend selecting means to each other;

first shifting/selecting means, into which the output of said adder, an output of said second register and the multiplicand are inputted, for, to the portion storing the positive part of a number with a redundant code of said second register, outputting a number in which the output of said second register is made into the lower bits thereof and the output of said adder is made into the higher bits thereof, or a number in which said multiplicand is made into the higher bits thereof and "0" is made into the lower bits thereof, and for, to the portion storing the negative part of the same, outputting a number in which the output of said register is made into the lower bits thereof and the output of said adder is made into the higher bits thereof;

second shifting/selecting means for, to the portions storing the positive and negative parts of a number with a redundant code of said first register, outputting a number in which the output of said adder is made into the lower bits thereof and "0" is made into the most significant bit thereof, by receiving the output of said adder;

a Booth decoder which generates a signal for controlling said addend selecting means by receiving the lower bits of the portion storing the positive part of a number with a redundant code of said second register; and finish detecting means for detecting the finishing of multiplication cycles by detecting that "1" exists in the portion storing the positive part and the negative part of a number with a redundant code of the lower bits of said second register.

4. A microcomputer, comprising:

an ALU having a first bus and a second bus; and a multiplying circuit having:

a first register which is connected to said first bus and said second bus and includes a portion storing a positive part of a number with a redundant code and a portion storing a negative part of the same, and which stores a part of a partial product indicated by a number with a redundant code;

a second register which is connected to said first bus and said second bus and includes a portion storing a positive part of a number with a redundant code and a portion storing a negative part of the same, and which stores a multiplicand or a part of a partial product indicated by a number with a redundant code;

a third register which is connected to said second bus, and which stores a multiplier by twos complement representation outputted from said ALU to said second bus;

addend selecting means for selecting any one of a number of two times of the multiplier, an inverted value of the number of two times of the multiplier, the multiplier, an inverted value of the multiplier or a number in which all bits are "1", by receiving an output of said third register;

an adder to which a carry signal is inputted, and which adds an output of said first register and an output of said addend selecting means to each other;

first shifting/selecting means, which is connected to said first bus and into which an output of said adder, the output of said second register and the multiplicand outputted from said ALU to said first bus are inputted, for, to the portion storing the positive part of a number with a redundant code of said second register, outputting a number in which the output of said second register is made into the lower bits thereof and the output of said adder is made into the higher bits thereof, or a number in which said multiplicand is made into the higher bits thereof and "0" is made into the lower bits thereof, and for, to the portion storing the negative part of the same, outputting a number in which the output of said second register is made into the lower bits thereof and the output of said adder is made into the higher bits thereof;

second shifting/selecting means for, to the portions storing the positive and negative parts of a number with a redundant code of said first register, outputting a number in which the output of said adder is made into the lower bits thereof and "0" is made into the most significant bit thereof, by receiving the output of said adder;

a Booth decoder which generates a signal for controlling said addend selecting means by receiving the lower bits of the portion storing the positive part of a number with a redundant code of said second register; and finish detecting means for detecting the finishing of multiplication cycles by detecting that "1" exists in the portion storing the positive part and the negative part of a number with a redundant code of the lower bits of said second register;

wherein said ALU outputs a multiplicand of n bits to said first bus and a multiplier of n bits to said second bus respectively, and makes said multiplying circuit start multiplication, and when said finish detecting means detects the finishing of the multiplication, said ALU reads a value of the higher bits of the portion storing a positive part of a number with a redundant code of said second register through said first bus and a value of the higher bits of the portion storing a negative part of the same through said second bus, thereafter obtains a multiplication result of n bits by subtracting the latter from the former.

5. A microcomputer, comprising:

an ALU having a first bus and a second bus; and a multiplying circuit having:

a first register which is connected to said first bus and said second bus and includes a portion storing a positive part of a number with a redundant code and a portion storing a negative part of the same, and which stores a part of a partial product indicated by a number with a redundant code;

a second register which is connected to said first bus and said second bus and includes a portion storing a positive part of a number with a redundant code and portion storing a negative part of the same, and which stores a multiplicand or a part of a partial product indicated by a number with a redundant code;

selecting means for selecting either an output of said first register or an output of said second register, and outputting it;

a third register which is connected to said second bus, and which stores a multiplier by twos complement representation outputted from said ALU to said second bus;

addend selecting means for selecting any one of a number of two times of the multiplier, an inverted value of the number of two times of the multiplier, the multiplier, an inverted value of the multiplier or a number in which all bits are "1", by receiving an output of said third register;

an adder to which a carry signal is inputted, and which adds the output of said first register and an output of said addend selecting means to each other;

first shifting/selecting means, which is connected to said first bus and into which an output of said adder, the output of said second register and the multiplicand outputted from said ALU to said first bus are inputted, for, to the portion storing the positive part of a number with a redundant code of said second register, outputting a number in which the output of said second register is made into the lower bits thereof and the output of said adder is made into the higher bits thereof, or a number in which said multiplicand is made into the higher bits thereof and "0" is made into the lower bits thereof, and for, to the portion storing the negative part of the same, outputting a number in which the output of said second register is made into the lower bits thereof and the output of said adder is made into the higher bits thereof;

second shifting/selecting means for, to the portions storing the positive and negative parts of a number with a redundant code of said first register, outputting a number in which the output of said adder is made into the lower bits thereof and "0" is made into the most significant bit thereof, by receiving the output of said adder;

a Booth decoder which generates a signal for controlling said addend selecting means by receiving the lower bits of the portion storing the positive part of a number with a redundant code of said second register;

finish detecting means for detecting the finishing of multiplication cycles by detecting that "1" exists in the portion storing the positive part and the negative part of a number with a redundant code of the lower bits of said second register (2); and sign judging means for judging a sign of the output of said adder, and giving "1" when the judged sign is positive and "0" when the judged sign is negative as the carry signal respectively to said adder;

wherein said ALU outputs a multiplicand of n bits to said first bus and a multiplier of n bits to said second bus respectively, and makes said multiplying circuit start multiplication, and when said finish detecting means detects the finishing of the multiplication, said ALU reads a value of the higher bits of the portion storing a positive part of a number with a redundant code of said second register through said first bus and a value of the higher bits of the portion storing a negative part of the same through said second bus, thereafter obtains lower bits of a multiplication result of 2n bits by subtracting the latter from the former, and reads a value of the higher bits of the portion storing a positive part of a number with a redundant code of said first register through said first bus and a value of the higher bits of the portion storing a negative part of the same through said second bus, thereafter obtains lower bits of a multiplication result of 2n bits by subtracting the latter from the former.

6. A microcomputer, comprising:

an ALU having a first bus and a second bus; and a multiplying circuit having:

a first register which is connected to said first bus and said second bus and includes a portion storing a positive part of a number with a redundant code and a portion storing a negative part of the same, and which stores a part of a partial product indicated by a number with a redundant code;

a second register which is connected to said first bus and said second bus and includes a portion storing a positive part of a number with a redundant code and a portion storing a negative part of the same, and which stores a multiplicand or a part of a partial product indicated by a number with a redundant code;

a sum of products register which is connected to said first bus and said second bus and composed of a portion storing a positive part of a number with a redundant code and a portion storing a negative part of the same, and which accumulates outputs of said second register;

selecting means for selecting either an output of said first register or an output of said sums of products register, and outputting it;

a third register which is connected to said second bus, and which stores a multiplier by twos complement representation outputted from said ALU to said second bus;

addend selecting means for selecting any one of a number of two times of the multiplier, an inverted value of the number of two times of the multiplier, the multiplier, an inverted value of the multiplier or a number in which all bits are "1", by receiving an output of said third register;

an adder to which a carry signal is inputted, and which adds the output of said first register and an output of said addend selecting means to each other;

first shifting/selecting means, which is connected to said first bus and into which the output of said adder, an output of said second register and the multiplicand outputted from said ALU to said first bus are inputted, for, to the portion storing the positive part of a number with a redundant code of said second register, outputting a number in which the output of said second register is made into the lower bits thereof and the output of said adder is made into the higher bits thereof, or a number in which said multiplicand is made into the higher bits thereof and "0" is made into the lower bits thereof, and for, to the portion storing the negative part of the same, outputting a number in which the output of said second register (2) is made into the lower bits thereof and the output of said adder is made into the higher bits thereof;

second shifting/selecting means for, to the portions storing the positive and negative parts of a number with a redundant code of said first register, outputting a number in which the output of said adder is made into the lower bits thereof and "0" is made into the most significant bit thereof, by receiving the output of said adder;

A Booth decoder which generates a signal for controlling said addend selecting means by receiving the lower bits of the portion storing the positive part of a number with a redundant code of said second register; and finish detecting means for detecting the finishing of multiplication cycles by detecting that "1" exits in the portion storing the positive part and the negative part of a number with a redundant code of the lower bits of said second register;

wherein said ALU at first clears the content of said sum of products register, then sequentially outputs m number of multiplicands each of n bits to said first bus and m number of multipliers each of n bits to said second bus respectively, and makes said multiplying circuit start m times of multiplication and said sum of products register accumulate m number of products, and said ALU reads the higher bits of the portion storing a positive part of a number with a redundant code of said sum of products register through said first bus and the higher bits of the portion storing a negative part of the same through said second bus, thereafter obtains sums of products of m times of multiplications by subtracting the latter from the former.

\* \* \* \* \*